(12) United States Patent
Georgis et al.

(10) Patent No.: US 11,417,125 B2
(45) Date of Patent: Aug. 16, 2022

(54) RECOGNITION OF LICENSE PLATE NUMBERS FROM BAYER-DOMAIN IMAGE DATA

(71) Applicant: SONY GROUP CORPORATION, Tokyo (JP)

(72) Inventors: Nikolaos Georgis, San Diego, CA (US); James Kuch, Wheaton, IL (US)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/107,058

(22) Filed: Nov. 30, 2020

(65) Prior Publication Data

US 2022/0171981 A1 Jun. 2, 2022

(51) Int. Cl.
G06K 9/00 (2022.01)
G06V 20/62 (2022.01)
G06V 30/413 (2022.01)

(52) U.S. Cl.
CPC ............ *G06V 20/63* (2022.01); *G06V 30/413* (2022.01); *G06V 20/625* (2022.01)

(58) Field of Classification Search
CPC ............ G06K 9/3258; G06K 9/00456; G06K 2209/15
See application file for complete search history.

(56) References Cited

U.S. PATENT DOCUMENTS

| 10,497,258 | B1 * | 12/2019 | Georgis | G06K 9/00805 |
| 2014/0301606 | A1 * | 10/2014 | Paul | G06K 9/3258 |
| | | | | 382/105 |
| 2017/0300786 | A1 * | 10/2017 | Gope | G06T 5/20 |
| 2018/0121744 | A1 * | 5/2018 | Kim | G06K 9/325 |
| 2019/0043178 | A1 | 2/2019 | Chen et al. | |
| 2020/0293794 | A1 * | 9/2020 | Popov | G06N 20/10 |
| 2021/0004626 | A1 * | 1/2021 | Hsu | G06K 9/342 |
| 2021/0350129 | A1 * | 11/2021 | Muhrbeck | G06K 9/6273 |
| 2021/0358081 | A1 * | 11/2021 | Kokura | G06T 3/4015 |

FOREIGN PATENT DOCUMENTS

CN 108665417 A 10/2018

OTHER PUBLICATIONS

Syu, et al., "Learning Deep Convolutional Networks for Demosaicing", Computer Vision and Pattern Recognition, Feb. 11, 2018, 14 pages.

* cited by examiner

*Primary Examiner* — Dhaval V Patel

(74) *Attorney, Agent, or Firm* — Chip Law Group

(57) ABSTRACT

A system and method for recognition of license plate numbers from Bayer-domain image data is provided. The system acquires Bayer-domain image data of a scene comprising a vehicle and inputs such image data to a Deep Neural Network (DNN) model trained for license plate detection (LPD) and license plate recognition (LPR). The system extracts an LPD result as an output of the DNN model. Based on the LPD result, the system extracts, from the input Bayer-domain image data, a region-of-interest (RoI) comprising a license plate image associated with the vehicle. The system inputs the extracted RoI to the DNN model and extracts, as an output of the DNN model, an LPR result which indicates a confidence of the DNN model in recognition of a license plate number of the vehicle from the input RoI. The system determines the license plate number based on the extracted LPR result.

17 Claims, 8 Drawing Sheets

RECOGNITION OF LICENSE PLATE NUMBERS FROM BAYER-DOMAIN IMAGE DATA

CROSS-REFERENCE TO RELATED APPLICATIONS/INCORPORATION BY REFERENCE

None.

FIELD

Various embodiments of the disclosure relate to license plate recognition. More specifically, various embodiments of the disclosure relate to a system and a method for recognition of license plate numbers from Bayer-domain image data.

BACKGROUND

Advancements in Automatic license plate recognition (ALPR) have paved way for cameras and other solutions which can recognize a license plate number of a vehicle in near real time. For example, law enforcement agencies may use ALPR to monitor vehicles on road and to detect fraudulent license plate numbers, blacklisted or stolen vehicles, or vehicle that may have committed traffic violations. Similarly, airport authorities may use ALPR for various Air Traffic Management (ATM) operations, such as to recognize an aircraft which may be about to depart from an airport, or to transit the airspace, or to land at a destination airport. ALPR may be further used for various other applications, such as to determine registration and license information of a vehicle or to collect toll for pay-per-use roads.

Typically, devices which implement ALPR include additional components, such as Image Signal Processor (ISP) and encoder/decoder and implement additional processes, such as encoding/decoding and various ISP operations for all image frames. Use of such components and processes typically leads to a degradation in image quality due to compression artifacts, adds a latency to a workflow for ALPR, and increases power requirements for such devices. Having more hardware makes such devices consume more power, adds to the volume and weight of such devices, and increases per device cost. Not all counties or districts can afford to have a widespread implementation of such devices as they may not fit their budgetary requirements for widespread implementation. Also, devices which typically include ISP have to settle for lower frame rates for ALPR as ISP occupies system resources.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system and method of recognition of license plate numbers from Bayer-domain image data, are provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
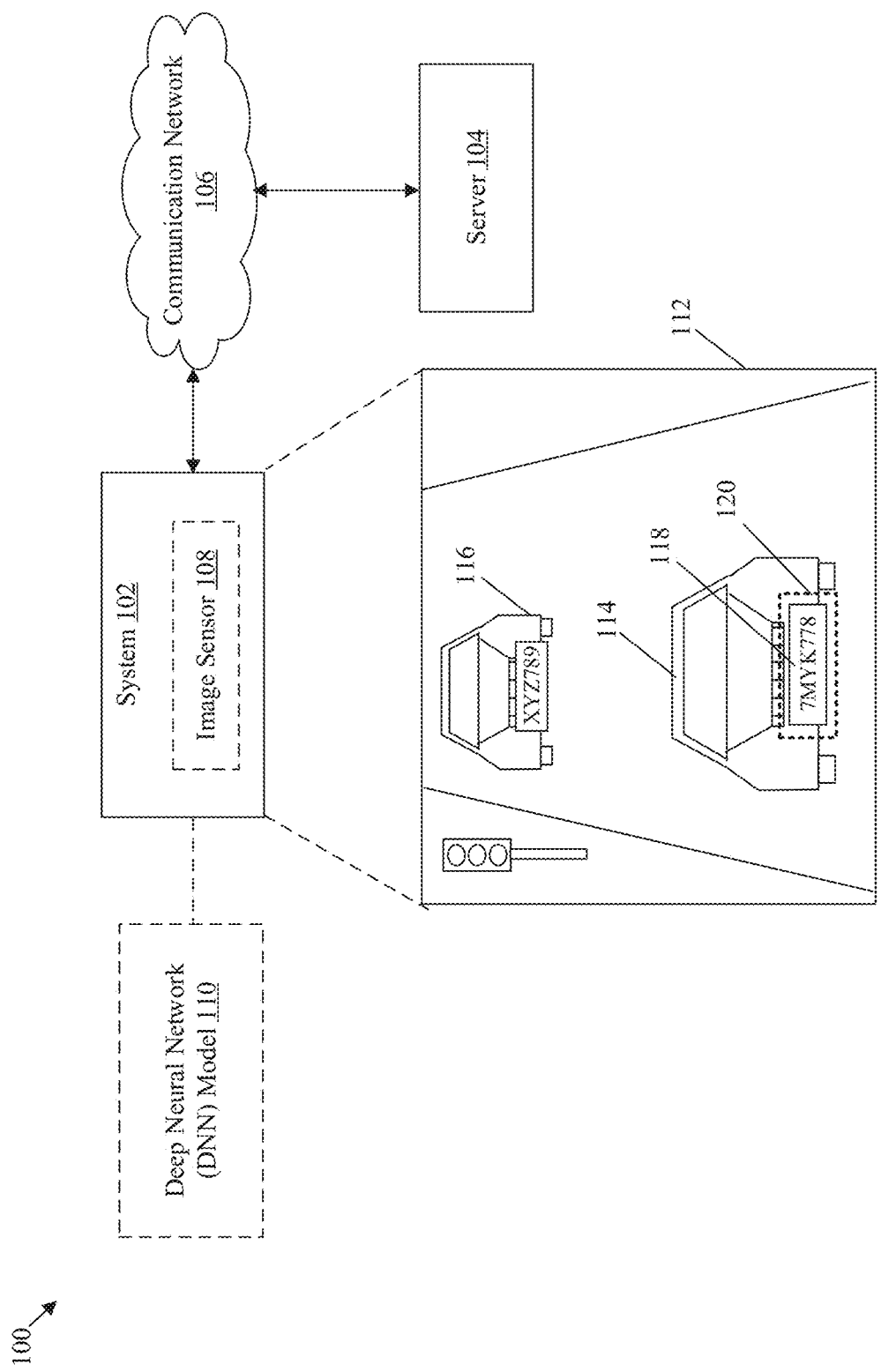
FIG. 1 is a block diagram that illustrates an exemplary network environment for determination of license plate number of a vehicle from Bayer-domain image data, in accordance with an embodiment of the disclosure. With FIG. 2 is a block diagram that illustrates an exemplary system for determination of a license plate number of a vehicle from Bayer-domain image data, in accordance with an embodiment of the disclosure.

The following described implementations may be found in the disclosed system and method for determination of a license plate number of a vehicle from Bayer-domain image data. Exemplary aspects of the disclosure provide a system (such as an image capture device). The system may be configured to acquire Bayer-domain image data of a scene that may include a vehicle. The system may input the acquired Bayer-domain image data to a Deep Neural Network (DNN) model. The DNN model may be trained for license plate detection (LPD) and license plate recognition (LPR). The system may extract an LPD result as a first output of the DNN model for the input Bayer-domain image data. The LPD result may include a bounding box around a region of interest (RoI) in the input Bayer-domain image data, in which a license plate of the vehicle may be present. The LPD result may also include a confidence score as a measure of confidence of the DNN model in the detection of the license plate. From the input Bayer-domain image data, the system may extract the RoI, which may include a license plate image associated with the first vehicle. The system may input the extracted RoI to the DNN model and may extract an LPR result as a second output of the DNN model for the input RoI. The system may determine the license plate number of the first vehicle based on the extracted first LPR result. In some embodiments, the extracted RoI may be debayered before the extracted RoI is input to the DNN model.

Conventionally, devices which implement ALPR include additional components, such as Image Signal Processor (ISP) and encoder/decoder and implement additional processes, such as encoding/decoding and various ISP operations for all image frames. Use of such components and processes typically leads to a degradation in image quality due to compression artifacts, adds a latency to a workflow for ALPR, and increases power requirements for such devices. Having more hardware makes such devices consume more power, adds to the volume and weight of such devices, and increases per device cost. Also, such devices which typically include ISP have to settle for lower frame rates for ALPR as ISP occupies system resources for longer times.

In contrast, the disclosed system may determine the license plate number of the vehicle, without use of an ISP or encoder/decoders, thereby reducing bill of materials (BOM) and cost of implementation. Additionally, the disclosed system may operate in Bayer space (i.e. use Bayer pattern images which may not be susceptible to compression artifacts). The system may also bypass de-Bayer and ISP for LPD, may fix exposure time for high speed operation (e.g., for 1/400s 1/500s), and may adjust gain based on statistics from Bayer plane histograms. Such actions may lead to improvement in accuracy of LPD/LPR, increased availability of system resources for LPR, and a scope for higher frame rates in LPR. The disclosed system may implement ISP operations and debayering for the extracted RoI for developing high quality crops for LPR. Additionally, a closed-loop adjustment may be incorporated by the system to adjust ISP parameters in post or imaging parameters, such as sensor gain or exposure time, for reacquisition of better-quality Bayer-domain image data settings based on LPR confidence.

FIG. 1 is a block diagram that illustrates an exemplary network environment for determination of license plate number of a vehicle from Bayer-domain image data, in accordance with an embodiment of the disclosure. With reference to FIG. 1, there is shown a network environment 100. The network environment 100 may include a system 102, a server 104, and a communication network 106. The system 102 may include an image sensor 108 and a deep neural network (DNN) model 110. The system 102 may communicate with the server 104 via the communication network 106. In FIG. 1, there is further shown a scene 112, which may be present in a field-of-view (FoV) of the image sensor 108. The scene 112 may include, for example, a first vehicle 114 and a second vehicle 116 on road.

The system 102 may include suitable logic, circuitry, and interfaces that may be configured to determine a license plate number of the first vehicle 114 based on Bayer-domain image data of a scene (such as the scene 112) which includes a vehicle (such as the first vehicle 114). Example implementations of the system 102 may include, but are not limited to, an image-capture device, a video camera (such as, but not limited to, a Dashboard camera, a body camera, or a Closed Circuit Television (CCTV)), a multi-camera setup on a vehicle, a road-side camera setup for monitoring traffic, an imaging system of an airdrome facility, a remote and virtual tower (RVT), or a local control tower for air traffic management (ATM), an in-vehicle Electronic Control Unit (ECU), a police mobile data terminal, a vehicle tracking computer, a server, a smartphone, a cellular phone, an eXtended Reality (XR) headset, a mainframe machine, a computer work-station, a consumer electronic (CE) device, and/or a combination thereof.

The server 104 may include suitable logic, circuitry, and interfaces, and/or code that may be configured for training the DNN model 110 for license plate detection (LPD) or license plate recognition (LPR). In some embodiments, the server 104 may be used to retraining the DNN model 110 on new instances of license plate images acquired by the image sensor 108 in operation. The server 104 may be implemented as a cloud server and may execute operations through web applications, cloud applications, HTTP requests, repository operations, file transfer, and the like. Other example implementations of the server 104 may include, but are not limited to, a database server, a file server, a web server, a media server, an application server, a mainframe server, or a cloud computing server.

In at least one embodiment, the server 104 may be implemented as a plurality of distributed cloud-based resources by use of several technologies that are well known to those of ordinarily skilled in the art. A person of ordinary skill in the art will understand that the scope of the disclosure may not be limited to the implementation of the server 104 and system 102 as two separate entities. In certain embodiments, the entire functionalities of the server 104 can be incorporated in its entirety or at least partially in the system 102, without a departure from the scope of the disclosure.

The communication network 106 may include a communication medium through which the system 102 and the server 104 may communicate with each other. The communication network 106 may be one of a wired connection or a wireless connection Examples of the communication network 106 may include, but are not limited to, the Internet, a cloud network, a Wireless Fidelity (Wi-Fi) network, a Personal Area Network (PAN), a Local Area Network (LAN), a cellular network (such as Long-Term Evolution (LTE) or 5th Generation New Radio (5G NR)), or a Metropolitan Area Network (MAN). Various devices in the network environment 100 may be configured to connect to the communication network 106 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The image sensor 108 may include suitable logic, circuitry, interfaces, and/or code that may be configured to acquire Bayer-domain image data of the scene 112 that may include at least a first license plate 118 of the first vehicle 114. The image sensor 108 may be arranged with suitable optical instruments, such as lenses and actuators for the lenses to focus on a scene and/or a particular object-of-interest in the scene 112.

Examples implementation of the image sensor 108 may include, but are not limited to, a passive pixel sensor, an active pixel sensor, a semiconductor charged coupled device (CCD) based image sensor, a Complementary metal-oxide-semiconductor (CMOS)-based image sensor, a backlit CMOS sensor with a global shutter, a Silicon-on-Insulator (SOI)-based single-chip image sensor, an N-type metal-oxide-semiconductor based image sensor, a flat panel detector, or other image sensors. Other example implementations of the image sensor 108 may include, but are not limited to, a wide-angle camera, a 360-degree camera, an action camera, a body camera, a closed-circuit television (CCTV) camera, a camcorder, a digital camera, camera phones, a times-of-flight camera (ToF) sensor, a night-vision sensor, and/or other image sensors.

In FIG. 1, the image sensor 108 is shown to be integrated with the system 102; however, the disclosure may not be so limiting. In some embodiments, the image sensor 108 may be separate from the system 102, without a deviation from the scope of the disclosure.

The DNN model 110 may be a model which may pre-trained for detection of a license plate of a vehicle (such as the first vehicle 114) and for recognition of a license plate number printed on the license plate based on Bayer-domain image data. The DNN model 110 may be a computational network or a system of artificial neurons, arranged in a plurality of layers, as nodes. The plurality of layers of the DNN model 110 may include an input layer, one or more hidden layers, and an output layer. Each layer of the plurality of layers may include one or more nodes (or artificial neurons, for example). Outputs of all nodes in the input layer may be coupled to at least one node of hidden layer(s). Similarly, inputs of each hidden layer may be coupled to outputs of at least one node in other layers of the DNN model 110. Outputs of each hidden layer may be coupled to inputs of at least one node in other layers of the DNN model 110. Node(s) in the final layer may receive inputs from at least one hidden layer to output a result. The number of layers and the number of nodes in each layer may be determined from hyper-parameters of the DNN model 110. Such hyper-parameters may be set before or while training the DNN model 110 on a training dataset of Bayer-domain image data of vehicles.

Each node of the DNN model 110 may correspond to a mathematical function (e.g., a sigmoid function or a rectified linear unit) with a set of parameters, tunable during training of the network. The set of parameters may include, for example, a weight parameter, a regularization parameter, and the like. Each node may use the mathematical function to compute an output based on one or more inputs from nodes in other layer(s) (e.g., previous layer(s)) of the DNN model 110. All or some of the nodes of the DNN model 110 may correspond to same or a different same mathematical function.

In training of the DNN model 110, one or more parameters of each node of the DNN model 110 may be updated based on whether an output of the final layer for a given input (from the training dataset) matches a correct result based on a loss function for the DNN model 110. For example, weights of the DNN model 110 may be updated based on a first loss associated with detection of a license plate image within the Bayer-domain image data and a second loss associated with determination of a license plate number from the license plate image. The above process may be repeated for same or a different input until a minima of loss function is achieved, and a training error is minimized. Several methods for training are known in art, for example, gradient descent, stochastic gradient descent, batch gradient descent, gradient boost, meta-heuristics, and the like.

The DNN model 110 may include electronic data, for example, a software program, code of the software program, libraries, applications, scripts, or other logic or instructions for execution by a processor of a processing device, such as the system 102. The DNN model 110 may include code and routines configured to enable a computing device, such as the system 102 to detect and recognize a license plate number from license plate images (i.e. Region of Interest) within the Bayer-domain image data. Additionally or alternatively, the DNN model 110 may be implemented using hardware, including but not limited to, a co-processor (such as an Inference Accelerator), a microprocessor (e.g., to perform or control performance of one or more operations), a field-programmable gate array (FPGA), or an application-specific integrated circuit (ASIC). Alternatively, in some embodiments, the DNN model 110 may be implemented using a combination of hardware and software.

Examples of the DNN model 110 may include, but are not limited to, a convolutional neural network (CNN), a recurrent neural network (RNN), a CNN-recurrent neural network (CNN-RNN), R-CNN, Fast R-CNN, Faster R-CNN, an artificial neural network (ANN), (You Only Look Once) YOLO network, a Long Short Term Memory (LSTM) network based RNN, CNN+ANN, LSTM+ANN, a gated recurrent unit (GRU)-based RNN, a fully connected neural network, a Connectionist Temporal Classification (CTC) based RNN, a deep Bayesian neural network, and/or a combination of such networks. In certain embodiments, the DNN model 110 may be based on a hybrid architecture of multiple Deep Neural Networks (DNNs).

In operation, the image sensor 108 may be configured to acquire the Bayer-domain image data of the scene 112. The scene 112 may include a plurality of vehicles, such as the first vehicle 114 and the second vehicle 116. The scene 112 may also include objects, such as, but not limited to, roads, traffic signals, sign boards, trees, humans/animals, and so forth. In FIG. 1, the first vehicle 114 and the second vehicle 116 are shown as four-wheeler cars; however, the disclosure may not be so limiting. In some embodiments, each of the first vehicle 114 and the second vehicle 116 may be any vehicle, such as a two-wheeler, a truck, a bus, an aerial vehicle (manned or unmanned), or a waterborne vessel.

In an embodiment, the image sensor 108 may be installed on a vehicle (such as a vehicle registered to a law enforcement agency) which may have the first vehicle 114 and the second vehicle 116 in the FoV of the image sensor 108. Details of the acquisition of the Bayer-domain image data of the scene 112 are further provided, for example, in FIG. 3A.

The system 102 may input the acquired Bayer-domain image data to the DNN model 110 that may be trained for license plate detection (LPD) and license plate recognition (LPR). The system 102 may extract an LPD result as a first output of the DNN model 110 for the input Bayer-domain image data. The LPD result may correspond to detection of the first license plate 118 of the first vehicle 114. Specifically, the LPD result may include, for example, bounding box coordinates and an LPD confidence score. For the input Bayer-domain image data, the bounding box coordinates (bx, by, bw, bh) may define a window portion of the input Bayer-domain image data in which the first license plate 118 is detected. The LPD confidence score may be a soft label (i.e. between 0 and 1) or a hard label (i.e. 0 or 1). If the LPD confidence score is above a threshold (for example, above 0.995), then the likelihood of the first license plate 118 within the bounding box coordinates may be high. If the LPD confidence score is below the threshold (for example, below 0.995), then the likelihood of the first license plate 118 within the bounding box coordinates may be low (with a degree to uncertainty). Details of the extraction of the LPD result are further provided, for example, in FIG. 3A.

The system 102 may extract a first region-of-interest (RoI) 120 based on the extracted LPD result. The first RoI 120 may include a first license plate image of the first license plate 118 associated with the first vehicle 114. For example, the first RoI 120 may include a first license plate image that may include a license plate number "7MYK778". Details of the extraction of the first RoI 120 are further provided, for example, in FIG. 3A.

In accordance with an embodiment, the system 102 may debayer the extracted first RoI 120. The extracted first RoI 120 may be debayered for reconstruction of a color image from the Bayer-domain image data. In an alternate embodiment, the DNN model 110 may be configured to debayer the extracted first RoI 120. Further, the debayered first RoI 120 may be processed based on application of a sequence of Image Signal Processing (ISP) operations on the debayered first RoI 120. Details of the debayering process of the first RoI 120 and the application of ISP operations are further provided, for example, in FIG. 3A.

The system 102 may further input the extracted first RoI 120 (or the debayered/processed first RoI) to the DNN model 110. The system 102 may extract a first LPR result as a second output of the DNN model 110 for the input first RoI 120. The first LPR result may indicate a confidence of the DNN model 110 in recognition of the license plate number (such as 7MYK778) of the first vehicle 114 from the input first RoI 120. For example, the first LPR result may include a license plate number of the first vehicle 114 and an LPR confidence score indicative of a confidence of the DNN model 110 in the recognition of the license plate number. Similar to LPD confidence score, the LPR confidence score may be a soft label (i.e. between 0 and 1) or a hard label (i.e. 0 or 1). The LPR confidence score may be a single value for the entire license plate number or may be a vector of confidence scores, where each element of the vector includes a confidence score for one of the characters of the license plate number. If the LPR confidence score is high (i.e. close to 1), then the recognition accuracy of the license plate number within the bounding box coordinates may be high. If the LPR confidence score is low (i.e. close to 0), then the recognition accuracy of the license plate number within the bounding box coordinates may be low (with a degree to uncertainty). Details of the extraction of the first LPR result are further provided, for example, in FIG. 3A.

The system 102 may determine the license plate number of the first vehicle 114 based on the extracted first LPR result. For example, for each character position of the license plate, the LPR result may have a specific character (from a group of characters, such as a space (' '), a hyphen (-), A-Z, and 0-9) with a maximum LPR confidence score. In order to determine the license plate number (such as "7MYK778"), the system 102 may select a specific character, which may have the maximum LPR confidence score among all possible characters, for each character position of the license plate number. Details of the determination of the license plate number are further provided, for example, in FIG. 3A.

Figure 2:
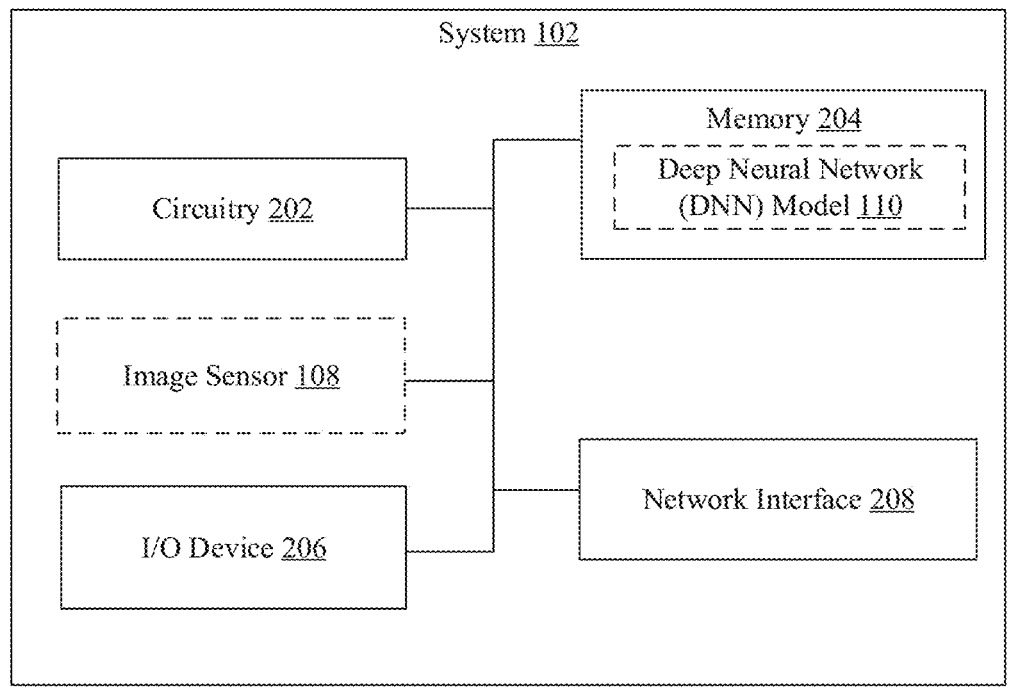

FIG. 2 is a block diagram that illustrates an exemplary system for determination of a license plate number of a vehicle from Bayer-domain image data, in accordance with an embodiment of the disclosure. With reference to FIG. 2, there is shown a block diagram 200 of the system 102. The system 102 may include circuitry 202, the image sensor 108, and a memory 204 that may include the DNN model 110. The block diagram 200 may further include an input/output (I/O) device 206 and a network interface 208.

The circuitry 202 may include suitable logic, circuitry, and interfaces that may be configured to execute program instructions associated with different operations to be executed by the system 102. The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may include suitable logic, circuitry, and interfaces that may be configured to store the program instructions to be executed by the circuitry 202. The memory 204 may further be configured to store the DNN model 110, the acquired Bayer-domain image data, and the LPD/LPR results. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, and interfaces that may be configured to receive an input and provide an output based on the received input. For example, a user may select the acquired Bayer-domain image data as an input for the DNN model 110 via the I/O device 206. The I/O device 206 which may include various input and output devices, may be configured to communicate with the circuitry 202. Examples of the I/O device 206 may include, but are not limited to, a touch screen, a keyboard, a mouse, a joystick, a microphone, a display device, and a speaker.

The network interface 208 may include suitable logic, circuitry, and interfaces that may be configured to facilitate communication between the circuitry 202 and the server 104, via the communication network 106. The network interface 208 may be implemented by use of various known technologies to support wired or wireless communication of the system 102 with the communication network 106. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 208 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 5th Generation new radio (5G NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

A person of ordinary skill in the art will understand that the system 102 in FIG. 2 may also include other suitable components or systems, in addition to the components or systems which are illustrated herein to describe and explain the function and operation of the present disclosure. A detailed description for the other components of the system 102 has been omitted from the disclosure for the sake of brevity. The operations of the circuitry 202 are further described, for example, in FIGS. 3A, 3B, 3C, 4, and 5.

Figure 3A:
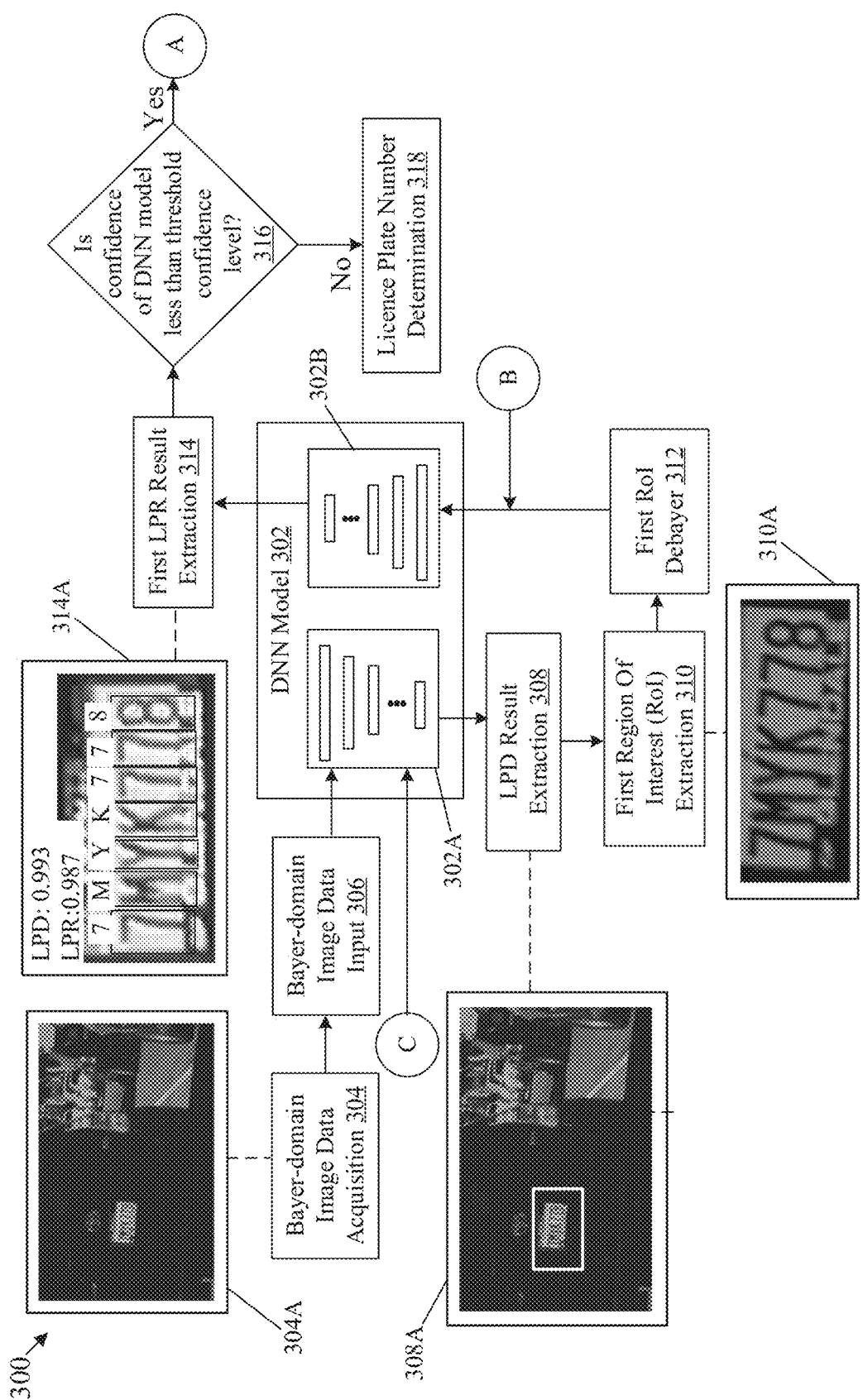
FIGS. 3A, 3B, and 3C are diagrams which collectively illustrate exemplary operations for determination of a license plate number of a vehicle from Bayer-domain image data, in accordance with an embodiment of the disclosure.
Figure 3B:
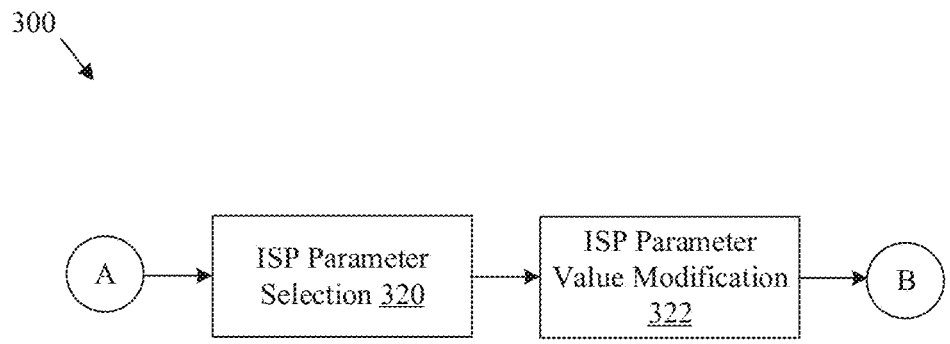
Figure 3C:
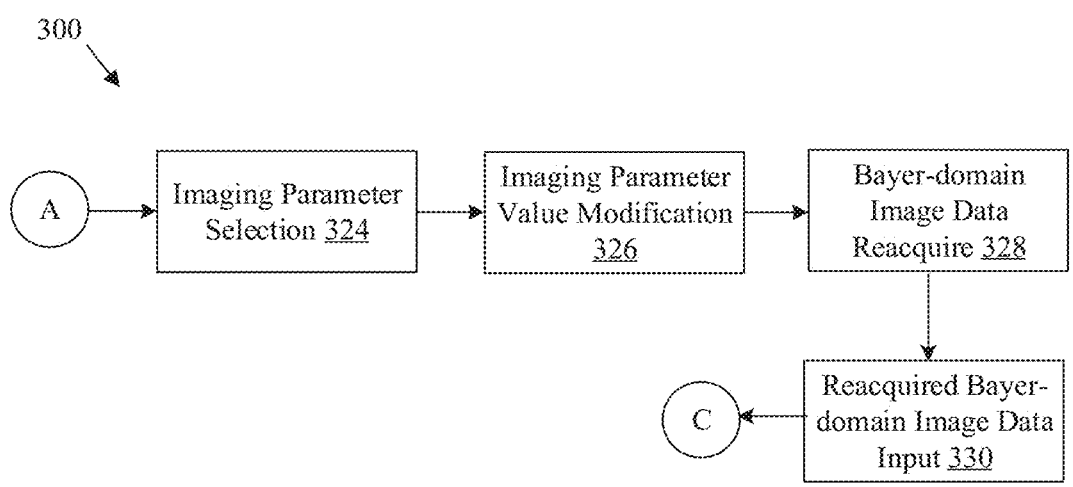

FIGS. 3A, 3B, and 3C are diagrams which collectively illustrate exemplary operations for determination of a license plate number of a vehicle from Bayer-domain image data, in accordance with an embodiment of the disclosure. FIGS. 3A, 3B, and 3C are described in conjunction with elements from FIGS. 1 and 2. With reference to FIGS. 3A, 3B, and 3C, there is shown a diagram 300 to depict exemplary operations from 304 to 330. In the diagram 300, there is shown a DNN model 302, which may be exemplary implementation of the DNN model 110 of FIG. 1.

At 304, Bayer-domain image data 304A is acquired. In accordance with an embodiment, the image sensor 108 may be configured to acquire the Bayer-domain image data 304A (also referred to as a Bayer pattern image) of a scene (such as the scene 112) that may include the first vehicle 114. In an exemplary scenario, the image sensor 108 may be installed on a police vehicle. For example, the image sensor 108 may be installed near a dashboard of the police vehicle. The acquired Bayer-domain image data 304A may include image of at least the first license plate 118 of the first vehicle 114.

At 306, the acquired Bayer-domain image data 304A may be input to the DNN model 302. In accordance with an embodiment, the circuitry 202 may be configured to input the Bayer-domain image data 304A to the DNN model 302. The DNN model 302 may be trained for LPD and LPR. For instance, the DNN model 302 may be trained on a dataset of test input images and labels of license plate numbers which correspond to the test input images. The dataset of test input images may include images of different license plates, such as with license plates of different sizes and fonts. Such images may be acquired under different lighting conditions and for different types of vehicles.

In an embodiment, the DNN model 302 may include separate networks for LPD and LPR. For example, the DNN model 302 may include a first network of NN layers 302A for LPD and a second network of NN layers 302B for LPR. In such a case, the acquired Bayer-domain image data 304A may be input to the first network of NN layers 302A of the DNN model 302. In some embodiments, the output of the first network of NN layers 302A may be coupled to an input for the second network of NN layers 302B.

At 308, an LPD result 308A may be extracted. In accordance with an embodiment, the circuitry 202 may be configured to extract the LPD result 308A from the DNN model 302 as a first output of the DNN model 302 for the input Bayer-domain image data 304A. The DNN model 302 may detect a presence of a license plate, such as the first license plate 118 of the first vehicle 114 in the Bayer-domain image data 304A. The LPD result 308A may include a bounding box, which may be indicative of an RoI in the Bayer-domain image data 304A. The LPD result 308A may also include a numeric value that may indicate a confidence of the DNN model 302 in detection of the first license plate 118 of the first vehicle 114.

At 310, a first RoI 310A may be extracted. In accordance with an embodiment, the circuitry 202 may be configured to extract the first RoI 310A from the input Bayer-domain image data 304A based on the extracted LPD result 308A. For example, the first RoI 310A may be extracted by cropping a region which may be within the input Bayer-domain image data 304A and may be bounded by the bounding box coordinates (as included in the LPD result 308A). The first RoI 310A may include the first license plate image associated with the first vehicle 114.

At 312, the extracted first RoI 310A may be debayered. In accordance with an embodiment, the DNN model 302 may be configured to debayer the input first RoI 310A. The debayering may be executed by the DNN model 302 to reconstruct an RGB/color image of the first license plate 118 of the first vehicle 114 from the first RoI 310A.

In accordance with an embodiment, the DNN model 302 may be configured to process the first ROI 310A based on application of a sequence of ISP operations on the first RoI 310A. Such operations may be applied before or after the first ROI 310A is debayered. Examples of the ISP operations may include, but are not limited to, bad pixel correction, white balancing, histogram equalization, and noise correction. For LPR, the circuitry 202 may be input the processed first RoI to the DNN model 302, such as to the first network of NN layers 302A of the DNN model 302.

At 314, a first LPR result 314A may be extracted. In accordance with an embodiment, the circuitry 202 may be further configured to extract the first LPR result 314A as a second output of the DNN model 302 for the input first RoI 310A. The DNN model 302 may generate the first LPR result 314A based on the input first RoI 310A. The first LPR result 314A may be generated by the second network of NN layers 302B of the DNN model 302. The first LPR result 314A may indicate the confidence of the DNN model 302 in recognition of the license plate number of the first vehicle 114 from the input first ROI 310A. The first LPR result 314A may include the confidence score for LPD (such as 0.993) and an overall confidence score (for example, "0.987") for LPR. Each confidence score may vary in a range of 0 to 1 (i.e. a soft label). Higher the confidence score, higher may be the accuracy of the LPD and the LPR performed by the DNN model 302.

In some instances, the first LPR result 314A may also include a character-wise confidence score for each character position of the license plate number (such as 7MYK778). For example, the first LPR result 314A may include a confidence score as "0.98" for a character "7" at a first character position of the license plate number. Similarly, the first LPR result 314A may include a confidence score of "0.87" for a character "M" at a second character position, which may be appear next to the first character position.

At 316, it may be determined whether the confidence of the DNN model 302 is less than a threshold confidence level. In accordance with an embodiment, the circuitry 202 may be configured to determine whether the confidence (such as the confidence score for LPR) of the DNN model 302 is less than the threshold confidence score (for example, 0.8 or 80%). In case the confidence is less than the threshold confidence score, control may pass to 320. Otherwise, control may pass to 318.

At 318, the license plate number may be determined. The license plate number may be determined based on a determination that the confidence of the DNN model 302 is more than the threshold confidence level (for example, "0.8"). In accordance with an embodiment, the circuitry 202 may be configured to determine the license plate number of the first license plate 118 of the first vehicle 114 based on the extracted first LPR result 314A. As an example, for each character position on the first license plate image within the extracted first ROI 310A, the circuitry 202 may select a character having a maximum confidence score from character-wise scores in the LPR result (such as the first LPR result 314A) to determine the license plate number (such as "7MYK778") of the first vehicle 114.

At 320, one or more ISP parameters may be selected. Such selection may be based on a determination that the confidence of the DNN model 302, as indicated by the extracted first LPR result 314A, is below the threshold confidence level (for example, "0.8"). In accordance with an embodiment, the circuitry 202 may be configured to select one or more ISP parameters based on a determination that the confidence of the DNN model 302, as indicated by the extracted first LPR result 314A, is below the threshold confidence level. Examples of such parameters may include, but are not limited to, a digital ISP gain, a brightness parameter, a contrast parameter, a sharpness parameter, a white balance parameter, a ISO sensitivity parameter, a noise reduction parameter, a denoising parameter, or a deblurring parameter.

At 322, one or more ISP parameter values may be modified. In accordance with an embodiment, the circuitry 202 may be configured to modify one or more ISP parameter values corresponding to the selected one or more ISP parameters. For example, the circuitry 202 may select the brightness parameter and may modify the brightness value for the brightness parameter. The debayered first RoI may be processed based on application of the modified ISP parameter value on the debayered first RoI. The circuitry 202 may modify the ISP parameter value corresponding to the "brightness parameter". The processed first RoI may be input to the DNN model 302. Control may pass to 314 and operation at 314 may be repeated for the processed first ROI 310A.

At 324, one or more imaging parameters may be selected from a set of imaging parameters associated with the image sensor 108. In accordance with an embodiment, the circuitry 202 may be configured to select one or more imaging parameters from a set of imaging parameters associated with the image sensor 108, based on the determination that the confidence of the DNN model 302 is below the threshold confidence level. In some embodiments, the set of imaging parameters may include at least one of a bit-depth of the acquired Bayer-domain image data 304A, an exposure time, and a sensor gain parameter.

The bit-depth may be selected to update a bit-depth of the Bayer-domain image data 304A to be acquired by the image sensor 108. The altering of the bit-depth may result in reduction in noise level in the Bayer-domain image data 304A as well as an increase in a number of tones per channel per pixel of the Bayer-domain image data 304A. The exposure time of the image sensor 108 may be selected to update a time span for which the image sensor 108 may be exposed to acquire the Bayer-domain image data 304A. The sensor gain parameter may be selected to alter the sensitivity of the image sensor 108 to light falling on the aperture of the image sensor 108.

At 326, one or more imaging parameter values may be modified. In accordance with an embodiment, the circuitry 202 may be configured to modify one or more imaging parameter values corresponding to the selected one or more imaging parameters. For example, the circuitry 202 may increase the bit-depth from "8-bits" to "16-bits". In another example, the circuitry 202 may increase the exposure time of the image sensor 108 to 2 seconds.

In accordance with an embodiment, the circuitry 202 may be configured to set a value of the sensor gain parameter associated with the image sensor 108 based on statistical information present in Bayer plane histograms of the acquired Bayer-domain image data 304A. The statistical information present in the Bayer plane histograms may indicate different parameters, such as color levels, exposure and white balance of the Bayer-domain image data 304A.

At 328, Bayer-domain image data may be reacquired. In accordance with an embodiment, the circuitry 202 may be configured to control the image sensor 108 based on the modified one or more imaging parameters values or the set value of the sensor gain parameter to reacquire the Bayer-domain image data.

At 330, the reacquired Bayer-domain image data may be input or passed as input to the DNN model 302. In accordance with an embodiment, the circuitry 202 may be configured to input the reacquired Bayer-domain image data to the DNN model 302. For example, the reacquired Bayer-domain image data may be input to the first network of NN layers 302A of the DNN model 302 for LPD. Thereafter, control may pass to 308 and operations from 308 to 316 may be repeated till the confidence of the DNN model 302 in the recognition of the license plate number crosses the threshold confidence level (determined at 316).

Operations at 320 and 324 may be executed iteratively until the confidence of the DNN model 302 is above the threshold confidence level. In any iteration, if the confidence of the DNN model 302 crosses the threshold confidence level, control may pass to 318 and the circuitry 202 may determine the license plate number of the first vehicle 114.

Although the diagram 300 is illustrated as discrete operations, such as 302, 304, 306, 308, 310, 312, 314, 316, 318, 320, 322, 324, 326, 328, and 330; however, in certain embodiments, such discrete operations may be further divided into additional operations, combined into fewer operations, or eliminated, depending on the particular implementation without detracting from the essence of the disclosed embodiments.

Figure 4:
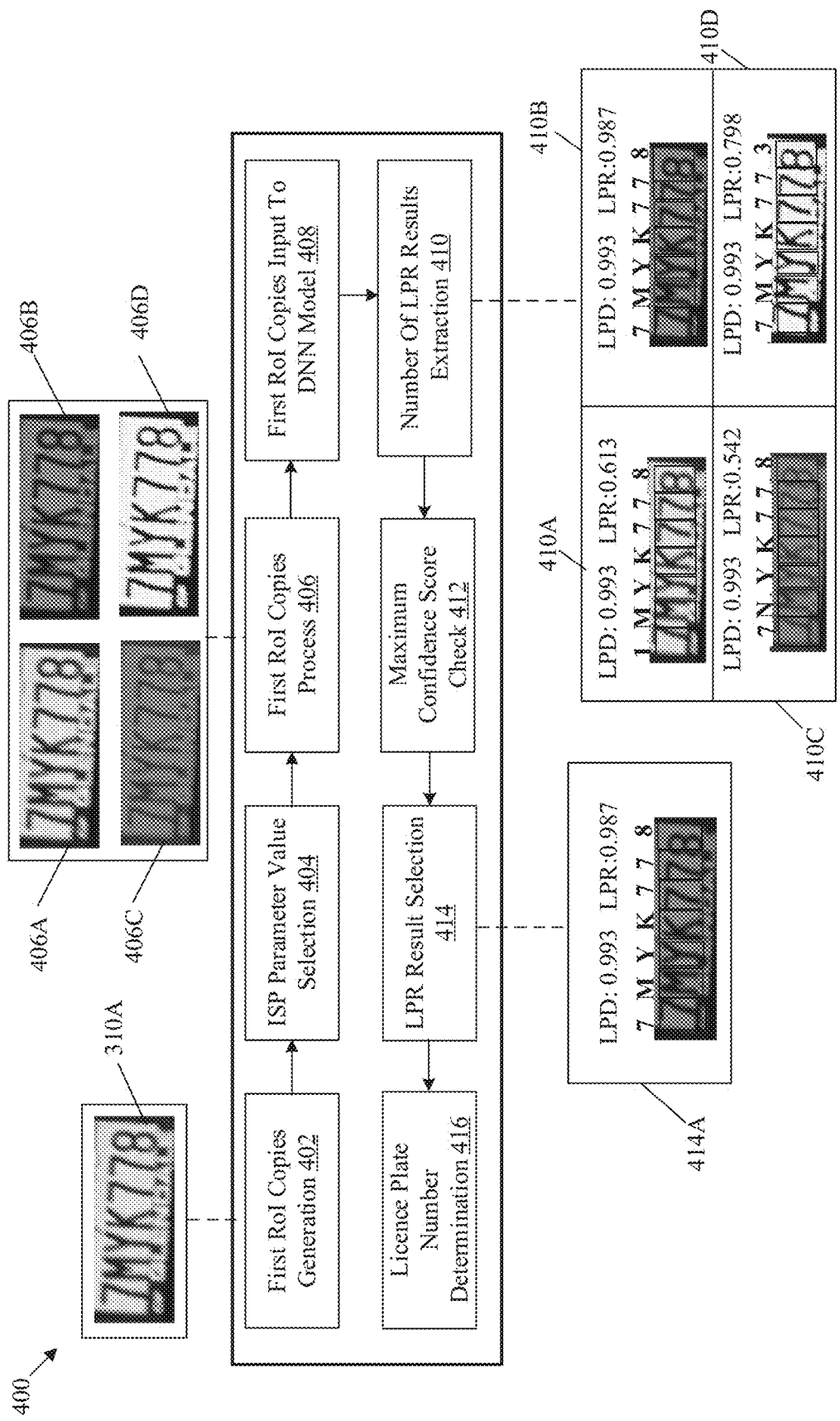
FIG. 4 is a diagram which illustrates an exemplary scenario of a parallel batch license plate recognition (LPR) for a robust determination of a license plate number of a vehicle, in accordance with an embodiment of the disclosure.

FIG. 4 is a diagram which illustrates an exemplary scenario of a parallel batch license plate recognition (LPR) for a robust determination of a license plate number of a vehicle, in accordance with an embodiment of the disclosure. FIG. 4 is described in conjunction with elements from FIGS. 1, 2, 3A, 3B and 3C. With reference to FIG. 4, there is shown a diagram 400. The operations of the diagram 400 may be executed by a computing system, such as the system 102 or the circuitry 202. The operations may start at 402.

At 402, copies of the first RoI 310A may be generated. In accordance with an embodiment, the circuitry 202 may be configured to generate copies of the extracted first RoI 310A. For example, the circuitry 202 may generate four copies of the first RoI 310A. The generated copies of the first RoI 310A may include the license plate number "7MYK778" of the first license plate 118 of the first vehicle 114.

At 404, an ISP parameter value may be selected for each of the generated copies. In accordance with an embodiment, the circuitry 202 may be configured to select an ISP parameter value for each of the generated copies of the extracted first RoI 310A. By way of example, and not limitation, the ISP parameter value for a sharpness parameter may be selected for a first copy of the first RoI 310A. The ISP parameter value for a contrast parameter may be selected for a second copy of the first RoI 310A. The ISP parameter value for a white balance parameter may be selected for a third copy of the first RoI 310A. The ISP parameter value for a brightness parameter may be selected for a fourth copy of the first RoI 310A.

At 406, the generated copies of the extracted first RoI 310A may be processed. In accordance with an embodiment, the circuitry 202 may be configured to process the generated copies of the extracted first RoI 310A by application of an ISP operation on each of the generated copies. The ISP operation may be applied based on a respective selection of the ISP parameter value.

By way of example, and not limitation, the circuitry 202 may generate a processed first copy 406A by modifying a value of the sharpness parameter for a first copy of the extracted first RoI 310A based on the selected value of the sharpness parameter. The circuitry 202 may generate a processed second copy 406B by modifying a value of the contrast parameter for a second copy of the extracted first RoI 310A based on the selected value of the control parameter. The circuitry 202 may further generate a processed third copy 406C by modifying a value of the white balance parameter for a third copy of the extracted first RoI 310A based on the selected value of the white balance parameter. The circuitry 202 may further generate by modifying a value of the brightness parameter for a fourth copy of the extracted first RoI 310A based on the selected value of the brightness parameter.

At 408, the processed copies of the first RoI 310A may be input to the DNN model 302. In accordance with an embodiment, the circuitry 202 may be configured to input a number of images that may include the extracted first RoI 310A and the processed copies (such as the processed first copy 406A, the processed second copy 406B, the processed third copy 406C and the processed fourth copy 406D) of the extracted first RoI 310A to the DNN model 302. In some embodiments, the processed copies of the extracted first RoI 310A may be debayered before such copies are input to the DNN model 302.

At 410, a number of LPR results may be extracted. In accordance with an embodiment, the circuitry 202 may be configured to extract the number of LPR results as corresponding second outputs of the DNN model 302 for the input number of images. The DNN model 302 may be configured to generate the number of LPR results based on the input number of images.

By way of example, and not limitation, the DNN model 302 may generate a first result 410A corresponding to the processed first copy 406A of the first RoI 310A. The first result 410A may include the characters "1MYK778" as against the characters "7MYK778" originally printed on the first license plate 118. The first result 410A may further include a first confidence score of the DNN model 302 for the LPD as "0.993" and the second confidence score for the LPR as "0.613". The DNN model 302 may generate a second result 410B corresponding to the processed second copy 406B of the first RoI 310A. The second result 410B may include the characters "7MYK778" as against the characters "7MYK778" originally printed on the first license plate 118. The second result 410B may further include a first confidence score of the DNN model 302 for the LPD as "0.993" and the second confidence score for the LPR as "0.987".

The DNN model 302 may further generate a third result 410C corresponding to the processed third copy 406C of the first RoI 310A. The third result 410C may include the characters "7NYK778" as against the characters "7MYK778" originally printed on the first license plate 118. The third result 410C may further include a first confidence score of the DNN model 302 for the LPD as "0.993" and the second confidence score for the LPR as "0.542".

The DNN model 302 may further generate a fourth result 410D corresponding to the processed fourth copy 406D of the first RoI 310A. The fourth result 410D may include the characters "7NYK773" as against the characters "7MYK778" originally printed on the first license plate 118. The fourth result 410D may further include a first confidence score of the DNN model 302 for the LPD as "0.993" and the second confidence score for the LPR as "0.789".

At 412, a maximum confidence score may be determined. In accordance with an embodiment, the circuitry 202 may be configured to determine a maximum confidence score from among the extracted number of LPR results. For example, the second confidence score for the LPR in the first result 410A is "0.613", the second confidence score for the LPR in the second result 410B is "0.987", the second confidence score for the LPR in the third result 410C is "0.542", and the second confidence score for the LPR in the fourth result 410D is "0.789". The circuitry 202 may compare the second confidence scores for the LPR among the extracted number of LPR results to determine the second confidence score "0.987" in the second result 410B as the maximum confidence score.

At 414, an LPR result 414A may be selected. In accordance with an embodiment, the circuitry 202 may be configured to select the LPR result 414A (that may correspond to the second result 410) from the extracted number of LPR results, based on a determination that the selected LPR result 414A may indicate the maximum confidence (e.g., the second confidence score "0.987" in the second result 410B) of the DNN model 302 in the recognition of the license plate number. Therefore, the circuitry 202 may select the LPR result 414A to accurately determine the license plate number for the first vehicle 114.

At 416, the license plate number may be determined based on the selected LPR result 414A. In accordance with an embodiment, the circuitry 202 may be configured to determine the license plate number of the first license plate 118 of the first vehicle 114 based on the selected LPR result 414A. For example, based on the selected LPR result 414A, the license plate number may be determined to include characters "7MYK778" corresponding to the license plate number of the first license plate 118.

Although the diagram 400 is illustrated as discrete operations, such as 402, 404, 406, 408, 410, 412, 414, and 416, however, in certain embodiments, such discrete operations may be further divided into additional operations, combined into fewer operations, or eliminated, depending on the particular implementation without detracting from the essence of the disclosed embodiments.

Figure 5:
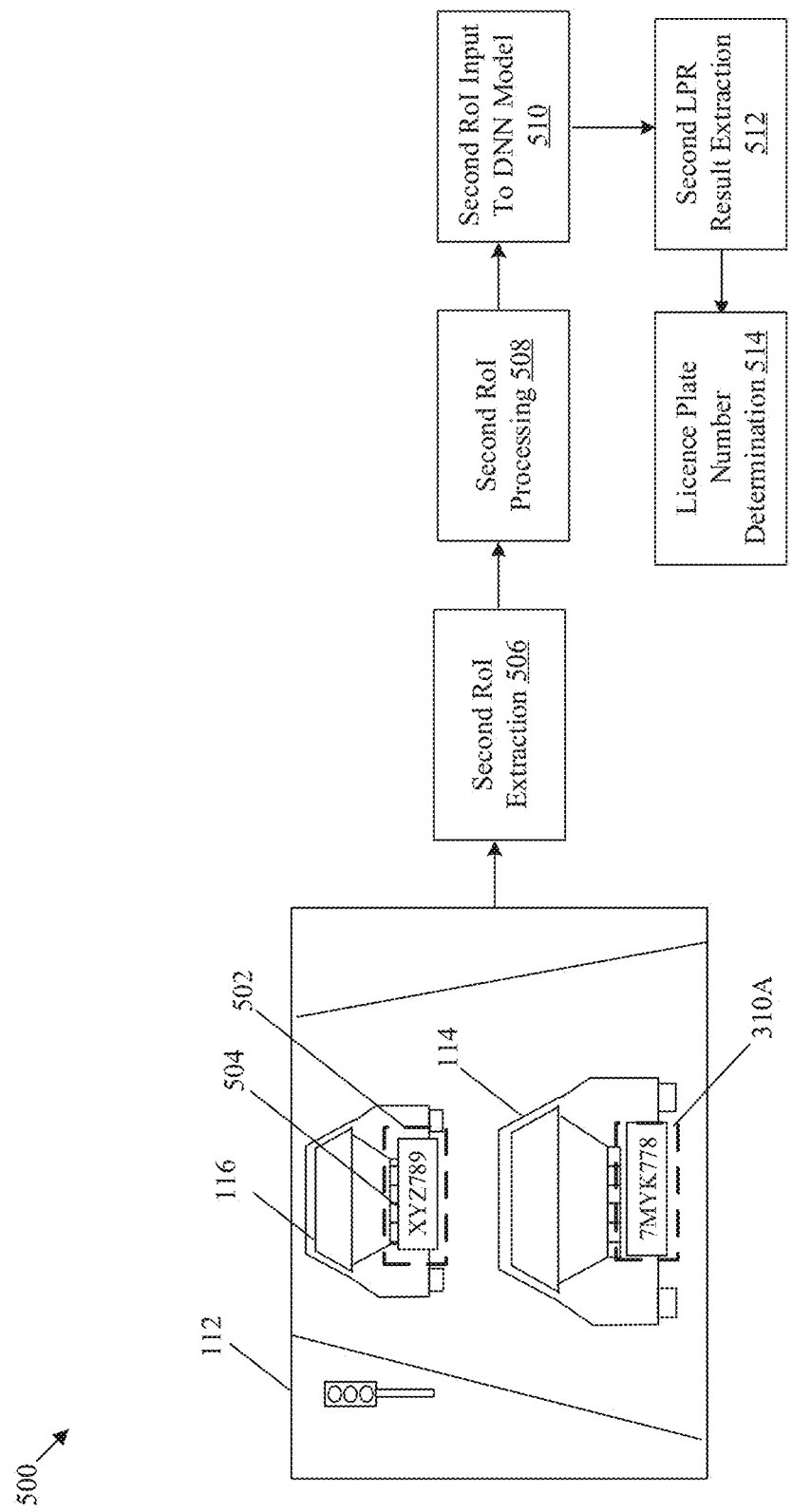
FIG. 5 is a diagram which illustrates exemplary operations for determination of license plate numbers of two or more vehicles from a Bayer pattern image, in accordance with an embodiment of the disclosure.

FIG. 5 is a diagram which illustrates exemplary operations for determination of license plate numbers of two or more vehicles from a Bayer pattern image, in accordance with an embodiment of the disclosure. FIG. 5 is described in conjunction with elements from FIGS. 1, 2, 3A, 3B, 3C, and 4. With reference to FIG. 5, there is shown a diagram 500. The operations illustrated in the diagram 500 may be executed by a computing system, such as the system 102 or the circuitry 202. The operations may start at 506.

At 506, a second RoI 502 may be extracted. In accordance with an embodiment, the circuitry 202 may be configured to extract the second RoI 502 that may include a second license plate image of a second license plate 504, such as "XYZ789" of the second vehicle 116. The second RoI 502 may be extracted from the Bayer-domain image data of the scene 112 which may include both the first vehicle 114 and the second vehicle 116. The second RoI 502 may be extracted in addition to the first RoI 310A in the Bayer-domain image data. The second RoI 502 may be extracted based on an LPD result generated by the DNN model 302. The extraction of the second RoI 502 may be same as the extraction of the first RoI 310A, as described, for example, in FIG. 3A. Therefore, the description of the extraction of the second RoI 502 is omitted from the disclosure for the sake of brevity.

At 508, the extracted second RoI 502 may be processed. In accordance with an embodiment, the circuitry 202 may be configured to process the extracted second RoI 502 by application of an ISP gain on the extracted second RoI 502. In an exemplary scenario, the circuitry 202 may be configured to apply a first ISP gain on the extracted first RoI 310A and a second ISP gain on the extracted second RoI 502. For example, the first license plate 118 in the Bayer-domain image data may appear to be darker as compared to the second license plate 504. The circuitry 202 may apply the first ISP gain on the extracted first RoI 310A to brighten the extracted first RoI 310A. Similarly, the circuitry 202 may apply the second ISP gain on the extracted second RoI 502 to match the brightness of the extracted second RoI 502 to that of the brightened first RoI 310A.

At 510, the extracted second RoI 502 may be input to the DNN model 302. In accordance with an embodiment, the circuitry 202 may be configured to input the processed second RoI 502 to the DNN model 302. The input of the second RoI 502 may be same as the input of the first RoI 310A to the DNN model 302, as described, for example, in FIG. 3A. Therefore, the description of the input of the second RoI 502 to the DNN model 302 is omitted from the disclosure for the sake of brevity.

At 512, a second LPR result may be extracted. In accordance with an embodiment, the circuitry 202 may be configured to extract the second LPR result as a third output of the DNN model 302 for the input second RoI 502. The DNN model 302 may be configured to generate the second LPR result. The second LPR result may indicate a confidence of the DNN model 302 in the recognition of a license plate number, such as "XYZ789" of the second vehicle 116 from the input second RoI 502. The second LPR result may include the first confidence score for the LPD and the second confidence score for the LPR. The second LPR result may further include the characters "XYZ789" corresponding to the second license plate 504 of the second vehicle 116. The generation of the second LPR result may be same as the generation of the first LPR result, as described, for example, in FIG. 3A. Therefore, the description of the generation of the second LPR result is omitted from the disclosure for the sake of brevity.

At 514, the license plate number may be determined. In accordance with an embodiment, the circuitry 202 may be configured to determine the license plate number of the second vehicle 116 based on the extracted second LPR result. The circuitry 202 may determine the license plate number of the second vehicle 116 as "XYZ789". The determination of the license plate number of the second vehicle 116 may be same as the determination of the license plate number of the first vehicle 114, as described, for example, in FIG. 3A.

Although the diagram 500 is illustrated as discrete operations, such as 502, 504, 506, 508, 510, 512 and 514, however, in certain embodiments, such discrete operations may be further divided into additional operations, combined into fewer operations, or eliminated, depending on the particular implementation without detracting from the essence of the disclosed embodiments.

Figure 6:
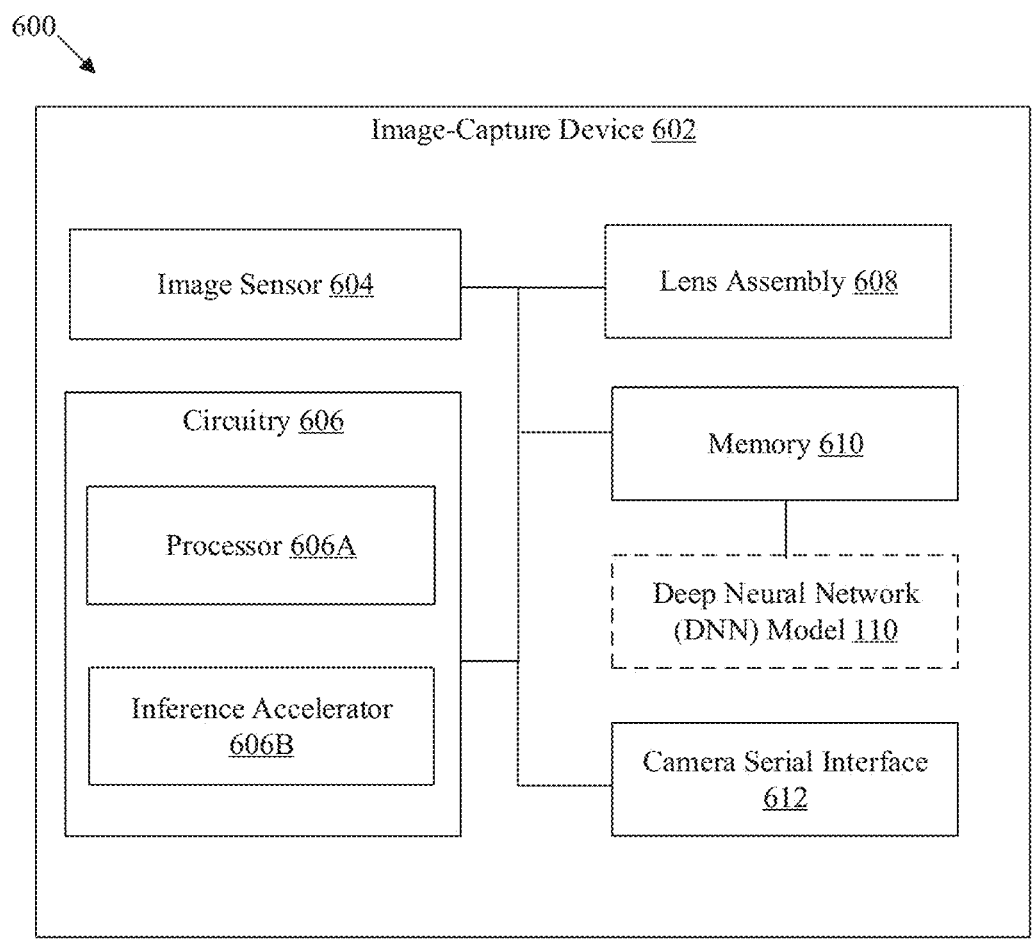
FIG. 6 is a block diagram that illustrates an exemplary implementation of a system for determination of a license plate number of a vehicle from Bayer-domain image data, in accordance with an embodiment of the disclosure.

FIG. 6 is a block diagram that illustrates an exemplary implementation of a system for determination of a license plate number of a vehicle from Bayer-domain image data, in accordance with an embodiment of the disclosure. FIG. 6 is described in conjunction with elements from FIGS. 1, 2, 3A, 3B, 3C, 4, and 5. With reference to FIG. 6, there is shown a block diagram 600 of an image-capture device 602. The image-capture device 602 may be an exemplary implementation of the system 102 of FIG. 1. The image-capture device 602 may include an image sensor 604 (which may be same as the image sensor 108) and circuitry 606. The circuitry 606 may include a processor 606A and an inference accelerator 606B. The image-capture device 602 may further include a lens assembly 608, a memory 610, the DNN model 110, and the camera serial interface 612.

The circuitry 606 may include suitable logic, circuitry, and interfaces that may be configured to determine the license plate number corresponding to the first vehicle 114 and the second vehicle 116. In some embodiments, the functions of the circuitry 606 may be same as the functions of the circuitry 202, as described, for example, in FIG. 2. Therefore, the description of the circuitry 606 is omitted from the disclosure for the sake of brevity.

The processor 606A may include suitable logic, circuitry, and interfaces that may be configured to execute program instructions stored in the memory 610. The processor 606A may be configured to execute the program instructions associated with different operations to be executed by the image-capture device 602. The processor 606A may be implemented based on a number of processor technologies known in the art. Examples of the processor technologies may include, but are not limited to, a Central Processing Unit (CPU), X86-based processor, a Reduced Instruction Set Computing (RISC) processor, an Application-Specific Integrated Circuit (ASIC) processor, a Complex Instruction Set Computing (CISC) processor, a Graphical Processing Unit (GPU), and other processors.

The inference accelerator 606B may include suitable logic, circuitry, and interfaces that may be configured to accelerate inference operations, image processing operations, and other computations of the DNN model 110. The inference accelerator 606B may be utilized for the determination of the license plate number in a time-efficient manner. The inference accelerator 606B may be implemented based on a number of technologies known in the art. Examples of the inference accelerator 606B may include, but are not limited to, a Field Programmable Gate Arrays (FPGA) based co-processor, a Vision Processing Unit (VPU), a Tensor Processing Unit (TPU), or an Artificial Intelligence (AI) accelerator chip.

The lens assembly 608 may include one or more optical lenses that may be required to focus a beam of light on an aperture of the image sensor 604 to enable the image sensor 604 to acquire the Bayer-domain image data of a scene (such as the scene 112) in FoV of the image sensor 604. The one or more optical lenses of the lens assembly 608 may be fixed to the image-capture device 602 or may be interchangeable with different optical lenses for example, of different focal lengths, apertures, and other properties. The lens assembly 608 may be utilized by the image-capture device 602 to eliminate or reduce optical aberrations that may arise while capturing the Bayer-domain image data 304A. Examples of the one or more optical lenses in the lens assembly 608 may include, but are not limited to, a standard lens, a telephoto lens, a wide angle lens, a fish eye lens, a macro lens, a tilt-shift lens, a prime lens and a zoom lens.

The functions of the memory 610 may be same as the functions of the memory 204 described, for example, in FIG. 2. Therefore, the description of the memory 610 is omitted from the disclosure for the sake of brevity.

The camera serial interface 612 may include suitable logic, circuitry, and interfaces that may be configured to enable communication between the image sensor 604 and a host processor, such as the circuitry 606 of the image-capture device 602. The camera serial interface 612, as specified by Mobile Industry Processor Interface (MIPI) Alliance may be one of CSI-1, CSI-2, or CSI-3.

Figure 7:
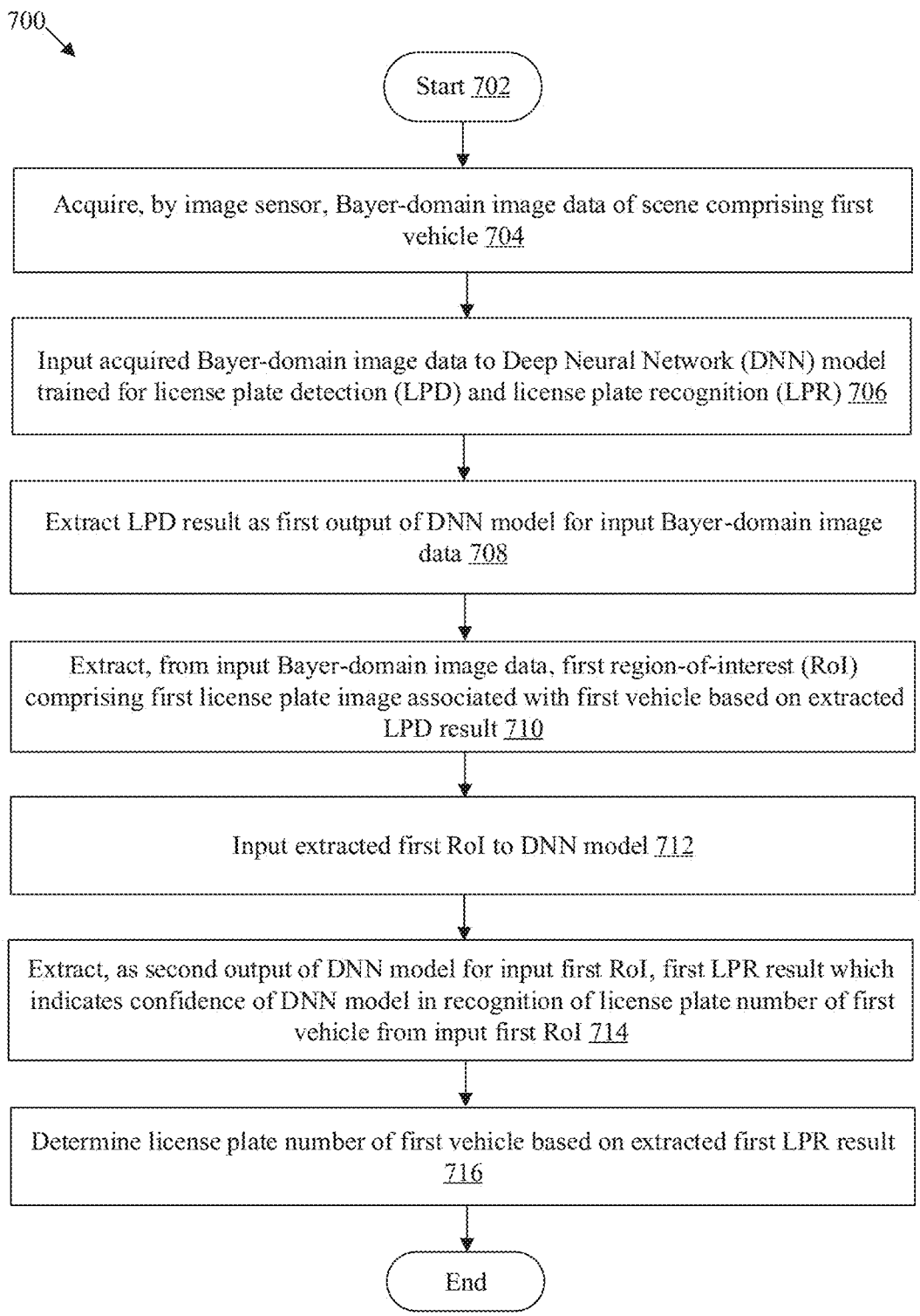
FIG. 7 is a flowchart that illustrates an exemplary method for determination of license plate number of a vehicle from Bayer-domain image data, in accordance with an embodiment of the disclosure.

FIG. 7 is a flowchart that illustrates an exemplary method for determination of license plate number of a vehicle from Bayer-domain image data, in accordance with an embodiment of the disclosure. FIG. 7 is described in conjunction with elements from FIGS. 1, 2, 3A, 3B, 3C, 4, 5 and 6. With reference to FIG. 7, there is shown a flowchart 700. The operations of the flowchart 700 may be executed by a computing system, such as the system 102 or the circuitry 202. The operations may start at 704 and proceed to 716.

At 704, the Bayer-domain image data 304A may be acquired. In accordance with an embodiment, the image sensor 108 of the system 102 may be configured to acquire the Bayer-domain image data 304A of the scene 112 that may include the first vehicle 114, as described, for example, in FIG. 3A.

At 706, the acquired Bayer-domain image data 304A may be input to the DNN model 110. In accordance with an embodiment, the circuitry 202 of the system 102 may be configured to input the acquired Bayer-domain image data 304A to the DNN model 110 trained for the LPD and the LPR as described, for example, in FIG. 3A.

At 708, the LPD result 308A may be extracted as the first output of the DNN model 110 for the input Bayer-domain image data 304A. In accordance with an embodiment, the circuitry 202 may be configured to extract the LPD result 308A as the first output of the DNN model 110 for the input Bayer-domain image data 304A as described, for example, in FIG. 3A.

At 710, the first RoI 310A may be extracted from the input Bayer-domain image data 304A. In accordance with an embodiment, the circuitry 202 may be configured to extract, from the input Bayer-domain image data 304A, the first RoI 310A that may include the first license plate image associated with the first vehicle 114, based on the extracted LPD result 308A, as described, for example, in FIG. 3A.

At 712, the extracted first RoI 310A may be input to the DNN model 110. In accordance with an embodiment, the circuitry 202 may be configured to input the extracted first RoI 310A to the DNN model 110, as described, for example, in FIG. 3A.

At 714, the first LPR result 314A may be extracted as the second output of the DNN model 110. In accordance with an embodiment, the circuitry 202 may be configured to extract the first LPR result 314A as the second output of the DNN model 110 for the input first RoI 310A. The first LPR result 314A may indicate the confidence of the DNN model 110 in recognition of the license plate number of the first vehicle 114 from the input first RoI 310A, as described, for example, in FIG. 3A.

At 718, the license plate number of the first vehicle 114 may be determined. In accordance with an embodiment, the circuitry 202 may be configured to determine the license plate number of the first vehicle 114 based on the extracted first LPR result 314A, as described, for example, in FIG. 3A. The control may pass to end.

Although the flowchart 700 is illustrated as discrete operations, such as 704, 706, 708, 710, 712, 714 and 718, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer-readable medium having stored thereon, computer-executable instructions that when executed by a system (such as the system 102) which includes an image sensor (such as the image sensor 108) and circuitry (such as the circuitry 202), causes the system 102 to execute operations. The operations include acquisition of Bayer-domain image data (such as the Bayer-domain image data 304A) of a scene (such as the scene 112) including a first vehicle (such as the first vehicle 114). The operations further include input of the acquired Bayer-domain image data 304A to a deep neural network (DNN) model (such as the DNN model 110) trained for license plate detection (LPD) and license plate recognition (LPR). The operations further include extraction of an LPD result (such as the LPD result 308A) as a first output of the DNN model for the input Bayer-domain image data 304A. The operations further include extraction, from a first region-of-interest (RoI) (such as the first RoI 310A) including a first license plate image associated with the first vehicle 114 based on the extracted LPD result 308A. The operations further include input of the extracted first RoI 310A to the DNN model 110. The operations further include extraction, as a second output of the DNN model 110 for the input first RoI 310A, a first LPR result (such as the first LPR result 314A). The first LPR result 314A indicates a confidence of the DNN model 110 in recognition of a license plate number of the first vehicle 114 from the input first RoI 310A. The operations further include determination of the license plate number of the first vehicle 114 based on the extracted first LPR result 314A.

Exemplary aspects of the disclosure may include a system (such as the system 102) which may include an image sensor (such as the image sensor 108) and circuitry (such as the circuitry 202). The image sensor 108 may be configured to acquire Bayer-domain image data (such as the Bayer-domain image data 304A) of a scene (such as the scene 112) including a first vehicle (such as the first vehicle 114). The circuitry 202 may further input the acquired Bayer-domain image data 304A to a deep neural network (DNN) model (such as the DNN model 110) trained for license plate detection (LPD) and license plate recognition (LPR). The circuitry 202 may further extract an LPD result (such as the LPD result 308A) as a first output of the DNN model for the input Bayer-domain image data 304A. The circuitry 202 may further extract, from a first region-of-interest (RoI) (such as the first RoI 310A) including a first license plate image associated with the first vehicle 114 based on the extracted LPD result 308A. The circuitry 202 may further input the extracted first RoI 310A to the DNN model 110. The circuitry 202 may further extract, as a second output of the DNN model 110 for the input first RoI 310A, a first LPR result (such as the first LPR result 314A). The first LPR result 314A may indicate a confidence of the DNN model 110 in recognition of a license plate number of the first vehicle 114 from the input first RoI 310A. The circuitry 202 may further determine the license plate number of the first vehicle 114 based on the extracted first LPR result 314A.

In accordance with an embodiment, the DNN model 110 may be configured to debayer the input first RoI 310A. The DNN model 110 may further generate the first LPR result 314A as the second output of the DNN model 110 for the debayered first RoI 310A as the input.

In accordance with an embodiment, the DNN model 110 may be configured to process the debayered first RoI 310A based on application of a sequence of Image Signal Processor (ISP) operations on the debayered first RoI 310A. The DNN model 110 may further generate the first LPR result 314A as the second output of the DNN model 110 for the processed first RoI 310A.

In accordance with an embodiment, the circuitry 202 may be configured to select at least one ISP parameter based on a determination that the confidence of the DNN model 110, as indicated by the extracted first LPR result 314A, is below a threshold confidence level. The circuitry 202 may further modify at least one ISP parameter value corresponding to the selected at least one ISP parameter. The debayered first RoI 310A may be processed further based on the modified at least one ISP parameter value.

In accordance with an embodiment, the at least one ISP parameter may include a digital ISP gain, a brightness parameter, a contrast parameter, a sharpness parameter, a white balance parameter, a ISO sensitivity parameter, a noise reduction parameter, a denoising parameter, or a deblurring parameter.

In accordance with an embodiment, the circuitry 202 may be further configured to select one or more imaging parameters from a set of imaging parameters associated with the image sensor 108 based on a determination that the confidence of the DNN model 110, as indicated by the extracted first LPR result 314A, is below a threshold confidence level. The circuitry 202 may further modify one or more imaging parameter values corresponding to the selected one or more imaging parameters. The circuitry 202 may further control the image sensor 108 based on the modified one or more current parameters values to reacquire the Bayer-domain image data 304A. The reacquired Bayer-domain image data 304A may be passed as the input to the DNN model 110.

In accordance with an embodiment, the set of imaging parameters may include at least one of a bit-depth of the acquired Bayer-domain image data 304A, an exposure time, and a sensor gain parameter.

In accordance with an embodiment, the circuitry 202 may be further configured to set a value of a sensor gain parameter associated with the image sensor 108 based on statistical information present in Bayer plane histograms of the acquired Bayer-domain image data 304A. The circuitry 202 may further control the image sensor 108 based on the set value of the sensor gain parameter to reacquire the Bayer-domain image data 304A. The reacquired Bayer-domain image data 304A may be passed as the input to the DNN model 110.

In accordance with an embodiment, the circuitry 202 may be configured to generate copies of the extracted first RoI 310A. The circuitry 202 may further select an Image Signal Processing (ISP) parameter value for each of the generated copies. The circuitry 202 may further process the generated copies by application of an ISP operation on each of the generated copies. The ISP operations may be applied based on the selected ISP parameter value.

In accordance with an embodiment, the circuitry 202 may be configured to input a number of images comprising the extracted first RoI 310A and the processed copies of the extracted first RoI 310A to the DNN model 110. The circuitry 202 may further extract a number of LPR results (such as a first result 410A, a second result 410B, a third result 410C and a fourth result 410D) as corresponding second outputs of the DNN model for the input number of images. The circuitry 202 may further select an LPR result (such as the second result 410B) from the extracted number of LPR results, based on a determination that the selected LPR result may indicate a maximum confidence of the DNN model 110 in the recognition of the license plate number. The circuitry 202 may further determine the license plate number of the first vehicle 114 based on the selected LPR result.

In accordance with an embodiment, the Bayer-domain image data 304A of the scene 112 may include a second vehicle (such as the second vehicle 116). The circuitry 202 may be configured to extract, from the input Bayer-domain image data 304A, a second RoI (such as the second RoI 502) including a second license plate image associated with the second vehicle 116. The circuitry 202 may process the extracted second RoI 502 by application of an ISP gain on the extracted second RoI 502. The circuitry 202 may further input the processed second RoI 502 to the DNN model 110. The circuitry 202 may further extract, as a third output of the DNN model 110 for the input second RoI 502, a second LPR result which may indicate a confidence of the DNN model 110 in the recognition of a license plate number of the second vehicle 116 from the input second RoI 502. The circuitry 202 may further determine the license plate number of the second vehicle 116 based on the extracted second LPR result.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:
1. A system, comprising:
an image sensor configured to acquire Bayer-domain image data of a scene comprising a first vehicle; and
circuitry communicatively coupled to the image sensor, wherein the circuitry is configured to:

input the acquired Bayer-domain image data to a Deep Neural Network (DNN) model trained for license plate detection (LPD) and license plate recognition (LPR);
extract an LPD result as a first output of the DNN model for the input Bayer-domain image data;
extract, from the input Bayer-domain image data, a first region-of-interest (RoI) comprising a first license plate image associated with the first vehicle based on the extracted LPD result;
input the extracted first RoI to the DNN model, wherein the DNN model:
  debayers the input first RoI, and
  generates a first LPR result as a second output of the DNN model for the debayered first RoI, and the first LPR result indicates a confidence of the DNN model in recognition of a license plate number of the first vehicle from the debayered first RoI;
extract the first LPR result as the second output of the DNN model;
select at least one Image Signal Processing (ISP) parameter based on a determination that the confidence of the DNN model, as indicated by the extracted first LPR result, is below a threshold confidence level;
modify at least one ISP parameter value corresponding to the selected at least one ISP parameter, wherein the DNN model further:
  processes the debayered first RoI based on the modified at least one ISP parameter value, and
  regenerates the first LPR result for the processed first RoI;
extract the regenerated first LPR result for the processed first RoI; and
determine the license plate number of the first vehicle based on the extracted first LPR result of the processed first RoI.

2. The system according to claim 1, wherein the DNN model further processes the debayered first RoI based on application of a sequence of Image Signal Processor (ISP) operations on the debayered first RoI.

3. The system according to claim 1, wherein the at least one ISP parameter comprises a digital ISP gain, a brightness parameter, a contrast parameter, a sharpness parameter, a white balance parameter, an ISO sensitivity parameter, a noise reduction parameter, a denoising parameter, or a deblurring parameter.

4. The system according to claim 1, wherein the circuitry is further configured to:
  select one or more imaging parameters from a set of imaging parameters associated with the image sensor based on a determination that the confidence of the DNN model, as indicated by the extracted first LPR result, is below the threshold confidence level;
  modify one or more imaging parameter values corresponding to the selected one or more imaging parameters; and
  control the image sensor based on the modified one or more imaging parameter values to reacquire the Bayer-domain image data,
    wherein the reacquired Bayer-domain image data is passed as the input to the DNN model.

5. The system according to claim 4, wherein the set of imaging parameters comprises at least one of a bit-depth of the acquired Bayer-domain image data, an exposure time, and a sensor gain parameter.

6. The system according to claim 1, wherein the circuitry is further configured to:
  set a value of a sensor gain parameter associated with the image sensor based on statistical information present in Bayer plane histograms of the acquired Bayer-domain image data; and
  control the image sensor based on the set value of the sensor gain parameter to reacquire the Bayer-domain image data,
    wherein the reacquired Bayer-domain image data is passed as the input to the DNN model.

7. The system according to claim 1, wherein the circuitry is further configured to:
  generate copies of the extracted first RoI;
  select an ISP parameter value of the at least one ISP parameter value for each of the generated copies; and
  process the generated copies by application of an ISP operation on each of the generated copies, wherein the ISP operations is applied based on the selected ISP parameter value.

8. The system according to claim 7, wherein the circuitry is further configured to:
  input a number of images comprising the extracted first RoI and the processed copies of the extracted first RoI to the DNN model;
  extract a number of LPR results as corresponding second outputs of the DNN model for the input number of images;
  select an LPR result from the extracted number of LPR results, based on a determination that the selected LPR result indicates a maximum confidence of the DNN model in the recognition of the license plate number; and
  determine the license plate number of the first vehicle based on the selected LPR result.

9. The system according to claim 1, wherein the Bayer-domain image data of the scene further comprises a second vehicle, and wherein the circuitry is further configured to:
  extract, from the input Bayer-domain image data, a second RoI comprising a second license plate image associated with the second vehicle;
  process the extracted second RoI by application of an ISP gain on the extracted second RoI;
  input the processed second RoI to the DNN model;
  extract, as a third output of the DNN model for the input second RoI, a second LPR result which indicates a confidence of the DNN model in the recognition of a license plate number of the second vehicle from the input second RoI; and
  determine the license plate number of the second vehicle based on the extracted second LPR result.

10. A method, comprising:
in a system that comprises an image sensor:
  acquiring, by the image sensor, Bayer-domain image data of a scene comprising a first vehicle;
  inputting the acquired Bayer-domain image data to a Deep Neural Network (DNN) model trained for license plate detection (LPD) and license plate recognition (LPR);
  extracting an LPD result as a first output of the DNN model for the input Bayer-domain image data;
  extracting, from the input Bayer-domain image data, a first region-of-interest (RoI) comprising a first license plate image associated with the first vehicle based on the extracted LPD result;
  inputting the extracted first RoI to the DNN model;
  debayering, by the DNN model, the input first RoI;

generating, by the DNN model, a first LPR result as a second output of the DNN model for the debayered first RoI, wherein
the first LPR result indicates a confidence of the DNN model in recognition of a license plate number of the first vehicle from the debayered first RoI;
extracting the first LPR result as the second output of the DNN model;
selecting at least one Image Signal Processing (ISP) parameter based on a determination that the confidence of the DNN model, as indicated by the extracted first LPR result, is below a threshold confidence level;
modifying at least one ISP parameter value corresponding to the selected at least one ISP parameter;
processing, by the DNN model, the debayered first RoI based on the modified at least one ISP parameter value, and
regenerating, by the DNN model, the first LPR result for the processed first RoI;
extracting the regenerated first LPR result for the processed first RoI; and
determining the license plate number of the first vehicle based on the extracted first LPR result of the processed first RoI.

11. The method according to claim 10, further comprising processing, by the DNN model, the debayered first RoI based on application of a sequence of Image Signal Processing (ISP) operations on the debayered first RoI.

12. The method according to claim 10, further comprising:
setting a value of a sensor gain parameter associated with the image sensor based on statistical information present in Bayer plane histograms of the acquired Bayer-domain image data; and
controlling the image sensor based on the set value of the sensor gain parameter to reacquire the Bayer-domain image data,
wherein the reacquired Bayer-domain image data is passed as the input to the DNN model.

13. The method according to claim 10, further comprising:
generating copies of the extracted first RoI;
selecting an ISP parameter value of the at least one ISP parameter value for each of the generated copies; and
processing the generated copies by application of an ISP operation on each of the generated copies, wherein the ISP operations is applied based on the selected ISP parameter value.

14. The method according to claim 13, further comprising:
inputting a number of images comprising the extracted first RoI and the processed copies of the extracted first RoI to the DNN model;
extracting a number of LPR results as corresponding second outputs of the DNN model for the input number of images;
selecting an LPR result from the extracted number of LPR results based on a determination that the selected LPR result indicates a maximum confidence of the DNN model in the recognition of the license plate number; and
determining the license plate number of the first vehicle based on the selected LPR result.

15. A non-transitory computer-readable medium having stored thereon, computer-executable instructions that when executed by a system, causes the system to execute operations, the operations comprising:
acquiring, by an image sensor, Bayer-domain image data of a scene comprising a first vehicle;
inputting the acquired Bayer-domain image data to a Deep Neural Network (DNN) model trained for license plate detection (LPD) and license plate recognition (LPR);
extracting an LPD result as a first output of the DNN model for the input Bayer-domain image data;
extracting, from the input Bayer-domain image data, a first region-of-interest (RoI) comprising a first license plate image associated with the first vehicle based on the extracted LPD result;
inputting the extracted first RoI to the DNN model;
debayering, by the DNN model, the input first RoI;
generating, by the DNN model, a first LPR result as a second output of the DNN model for the debayered first RoI, wherein
the first LPR result indicates a confidence of the DNN model in recognition of a license plate number of the first vehicle from the debayered first RoI;
extracting the first LPR result as the second output of the DNN model;
selecting at least one Image Signal Processing (ISP) parameter based on a determination that the confidence of the DNN model, as indicated by the extracted first LPR result, is below a threshold confidence level;
modifying at least one ISP parameter value corresponding to the selected at least one ISP parameter;
processing, by the DNN model, the debayered first RoI based on the modified at least one ISP parameter value, and
regenerating, by the DNN model, the first LPR result for the processed first RoI;
extracting the regenerated first LPR result for the processed first RoI; and
determining the license plate number of the first vehicle based on the extracted first LPR result of the processed first RoI.

16. A system, comprising:
an image sensor configured to acquire Bayer-domain image data of a scene comprising a first vehicle; and
circuitry communicatively coupled to the image sensor, wherein the circuitry is configured to:
input the acquired Bayer-domain image data to a Deep Neural Network (DNN) model trained for license plate detection (LPD) and license plate recognition (LPR);
extract an LPD result as a first output of the DNN model for the input Bayer-domain image data;
extract, from the input Bayer-domain image data, a first region-of-interest (RoI) comprising a first license plate image associated with the first vehicle based on the extracted LPD result;
input the extracted first RoI to the DNN model;
extract, as a second output of the DNN model for the input first RoI, a first LPR result which indicates a confidence of the DNN model in recognition of a license plate number of the first vehicle from the input first RoI;
select one or more imaging parameters from a set of imaging parameters associated with the image sensor based on a determination that the confidence of the DNN model, as indicated by the extracted first LPR result, is below a threshold confidence level;

modify one or more imaging parameter values corresponding to the selected one or more imaging parameters;
control the image sensor based on the modified one or more imaging parameter values to reacquire the Bayer-domain image data,
  wherein the reacquired Bayer-domain image data is passed as the input to the DNN model; and
determine the license plate number of the first vehicle based on the reacquisition of the Bayer-domain image data.

17. A system, comprising:
an image sensor configured to acquire Bayer-domain image data of a scene comprising a first vehicle and a second vehicle; and
circuitry communicatively coupled to the image sensor, wherein the circuitry is configured to:
  input the acquired Bayer-domain image data to a Deep Neural Network (DNN) model trained for license plate detection (LPD) and license plate recognition (LPR);
  extract an LPD result as a first output of the DNN model for the input Bayer-domain image data;
  extract, from the input Bayer-domain image data, a first region-of-interest (RoI) and a second RoI based on the extracted LPD result, wherein
    the first RoI comprises a first license plate image associated with the first vehicle, and
    the second RoI comprises a second license plate image associated with the second vehicle;
  input the extracted first RoI to the DNN model;
  process the extracted second RoI by application of an ISP gain on the extracted second RoI;
  input the processed second RoI to the DNN model;
  extract, as a second output of the DNN model for the input first RoI, a first LPR result which indicates a confidence of the DNN model in recognition of a license plate number of the first vehicle from the input first RoI;
  extract, as a third output of the DNN model for the input second RoI, a second LPR result which indicates a confidence of the DNN model in recognition of a license plate number of the second vehicle from the input second RoI; and
  determine the license plate number of each of:
    the first vehicle based on the extracted first LPR result, and
    the second vehicle based on the extracted second LPR result.

* * * * *